Figure 1:
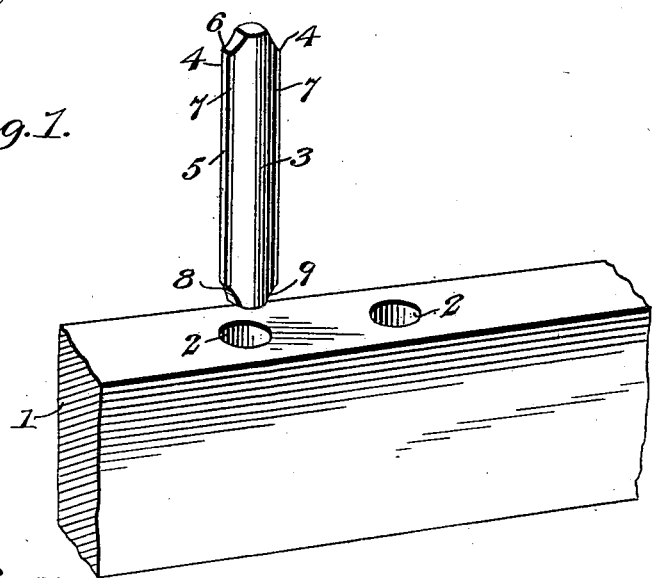

No. 667,219. Patented Feb. 5, 1901.
J. N. HIERONYMUS.
DOWEL PIN.
(Application filed Oct. 24, 1900.)
(No Model.)

Jasper N. Hieronymus
Inventor

Witnesses

By
Attorney

THE NORRIS PETERS CO., PHOTO-LITHO., WASHINGTON, D. C.

UNITED STATES PATENT OFFICE.

JASPER N. HIERONYMUS, OF FAIRBURY, ILLINOIS.

DOWEL-PIN.

SPECIFICATION forming part of Letters Patent No. 667,219, dated February 5, 1901.

Application filed October 24, 1900. Serial No. 34,191. (No model.)

*To all whom it may concern:*

Be it known that I, JASPER N. HIERONYMUS, a citizen of the United States, residing at Fairbury, in the county of Livingston and State of Illinois, have invented a new and useful Dowel-Pin, of which the following is a specification.

My present invention has relation to improvements in dowel-pins; but before proceeding with the description thereof it may be well, by way of premise, to refer briefly to efforts which have been made in this art to secure a perfect dowel or pin joint. The dowel-pin originally was a plain cylindrical pin having its opposite ends driven into blind holes formed in the members intended to be joined. The impossibility of securing a sufficiently tight fit between the dowel and the walls of the openings suggested a variation of the pin, which consisted in making them of tapering form, but this was also objectionable for the reason that when drawn longitudinally a very slight distance under extraordinary strain the wedge-shaped pin would necessarily become entirely loosened. The wedge-shaped dowel-pin was followed by a return to the plain cylindrical pin coated with glue, the glue being applied either upon the pin or within the hole prior to the closing of the joint. This form of connection between the pin and the joint or mortise members is most common at the present time; but this use of glue is objectionable: first, because of its cost and the expense attached to its application, and, second, because upon continued exposure to the air it gradually rots and loses its power to hold the pin, and, furthermore, because in order to secure a sufficiently tight fit between the pin and its hole their diameters have been so nearly identical as to preclude the possibility of retaining an effective amount of glue between the pin and the wall of the opening. This latter objection has been overcome in part by the provision of longitudinal channels formed in the exterior surface of the pin and designed for the retention of the glue; but this expedient, while increasing the quantity of glue, provided openings for the admission of air around the pin and into the hole at the lower end thereof, the consequence being that the glue was quickly rotted and the pin released. In this last-named form of dowels an attempt was made to secure greater holding force by forming those portions of the dowels between the channels with sharp edges of substantially V-shaped cross-sectional contour and designed to cut into the walls of the blind hole; but this slight increase of the effective frictional area of the pin was little, if any, more than an offset for the decrease of the effective area caused by the presence of the longitudinal channels, and as a consequence these projecting edges or beads did not increase the holding power of the original pin, but served merely to offset the decrease of its efficiency by the provision which had been made for a comparatively great quantity of glue. In the light of these various efforts to secure an effective and inexpensive dowel-joint I have conducted a number of experiments extending over a considerable period, my object being to produce a pin which when driven into the blind hole of the mortise member will become an absolute fixture without necessity for the employment of glue and one which would have the same degree of holding power at any point of its inserted portion as distinguished from a wedge-shaped dowel, which is effective only at the point of its greatest inserted diameter. The result of my experiments has been the production of a wooden dowel of a diameter practically identical with the diameter of the blind hole and having longitudinal ribs extending from the face of the pin preferably at diametrically-opposite points and which when the pin is driven into the wood will constitute superficial bodies of fiber which will lose their formative identity under the pressure to which they will be subjected between the wall of the opening and the body of the pin. The result of this pressure will be to condense the fibrous structure of both the pin and the joint member subjected to pressure by the introduction of the superficial body or rib, which latter, having a similar fibrous structure, will be flattened against the body of the pin and will be actually incorporated therein, the sharp angular definition of the rib being entirely obliterated and the circular cross-sectional contour of the pin being slightly distorted at diametrically-opposite points by the compression of the ribs and the adjacent fibers of the pin, the uniform curvature of the wall of the blind hole being correspondingly distorted and the adjacent fibers of the mortise member being likewise compressed. The result of this will be to entirely fill the blind hole and to wedge the pin therein throughout its entire length, the distortion of the pin and the wall of the hole by the introduction of the superficial fiber serving to effect something analogous to a tongue-and-groove connection between the pin and mortise member, and adjacent fibers of those portions analogous to the tongue and groove being condensed, and thereby rendered additionally effective to securely retain the pin in place without necessity for the employment of glue. If, however, it should be desired to place a small quantity of glue in the bottom of the opening, the contact between the wall of the latter and the face of the pin will be so complete and continuous as to prevent the possibility of the disintegration of the glue by contact with air, which would otherwise find its way around the pin. Under ordinary circumstances, however, I do not employ glue for the retention of the dowel-pin; but in order to make a more perfect joint between the faces of connected mortise members glue may be interposed in the manner understood in the art.

My invention as thus defined is illustrated in the accompanying drawings, in which—

Figure 2:
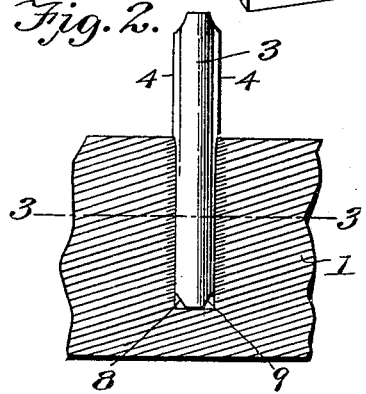
Figure 3:
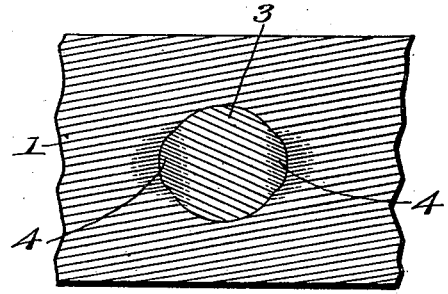
Figures 4, 6:
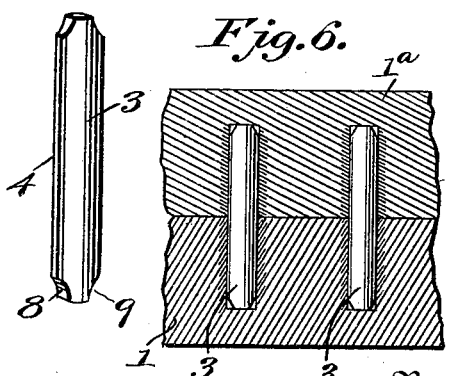
Figure 5:
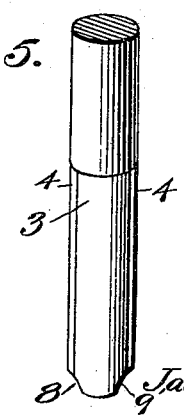

Figure 1 is a perspective view of a fragment of a mortise or joint member with my novel pin in position to be passed into one of the blind holes. Fig. 2 is a sectional view of a fragment of the member with the pin driven into the hole, the short-line cross-hatching being designed to indicate the condensing of the fiber at points opposite the ribs of the pin. Fig. 3 is a magnified transverse sectional view on the line 3 3 of Fig. 2, showing the form assumed by the pin and by the wall of the opening. In this figure also the short-line hatching is intended to define the area of condensed fibers, and Figs. 4 and 5 are views of modified forms of the pin. Fig. 6 is a sectional view through portions of two boards fastened together by two of my dowels.

Referring to the numerals employed to designate corresponding parts in the several views, 1 indicates the mortise or joint member, provided with the usual blind holes 2 of true cylindrical form, designed for the reception of a dowel-pin 3. The diameter of the pin 3 is substantially identical with that of either blind hole 2, so that the pin when driven to place will completely fill the opening.

In accordance with my invention, as heretofore described, the pin 3 is provided with a pair of diametrically-opposite longitudinally-disposed ribs 4, which are of rectangular cross-sectional contour, as shown in Fig. 1. This peculiar form imparts to each rib an outer flat face 5 and flat edge faces 6 and 7, disposed in right-angular relation to the face 5. At each end the pin is beveled or pointed somewhat, the beveled faces 8 and 9 being extended from the end of the pin and terminating at the outer faces of the ribs to facilitate the entrance of both the pin and the ribs into the blind hole. When the pin is driven into the hole, the ribs will be distorted and condensed until the cross-sectional contour of the pin and ribs assume the form illustrated in Fig. 3, it being observed that the pressure of the wall of the mortise member will cause the corners of the ribs at the opposite sides of the face 5 to be mashed against the face of the pin, with an accompanied condensation of the fibers of both the rib and the adjacent face of the wall.

In Fig. 6 of the drawings I have illustrated in section fragments of a pair of joint members or boards united by means of a pair of dowel-pins in accordance with my invention, both ends of the pins being beveled, as heretofore described, to facilitate the entrance of the opposite ends of the pins into blind holes sunk in the abutting edges of the boards.

In Fig. 4 of the drawings I have illustrated a modification of my pin, which consists in employing a single rib, and in Fig. 5 a still further modification which consists in reducing the diameter of the pin for a portion of its length in order to define a pair of ribs. This modification serves to illustrate the manner in which the ends of long rods may be formed for attachment—as, for instance, in securing the ends of posts or the rungs of ladders, &c. It will be understood, however, that my invention is applicable for use in providing dowel-joints for various classes of furniture, and that necessarily the specific form of the pin may be varied in accordance with the particular purpose for which it is intended. I therefore wish to reserve the right to effect such modifications and variations thereof as may be properly comprehended within the scope of the protection prayed.

What I claim is—

1. A fibrous dowel-pin having a rib provided with a flat outer face.

2. A fibrous dowel-pin provided with a longitudinal rib having a flat outer face and edge faces extending from the opposite sides thereof to the face of the pin.

3. A fibrous dowel-pin provided with an integral, longitudinal rib having a flat outer face and edge faces in angular relation thereto to form corners designed to be obliterated by compression of the fibers when the pin is driven into a joint member.

4. A fibrous dowel-pin provided with a longitudinal rib having a flat outer face and edge faces in angular relation thereto, the ends of said pin being provided with beveled faces extending across the ends of the ribs.

5. The combination with a fibrous joint member provided with an opening, of a dowel-pin having a cross-sectional contour corresponding to that of the opening and of the same diameter, said pin having a longitudinal rib provided with a flat outer face and parallel edge faces disposed in angular relation to the flat outer face, whereby the angular form of said rib will be obliterated and the fibers thereof and of the adjacent portion of the member, will be condensed when the pin is driven into the opening.

In testimony that I claim the foregoing as my own I have hereto affixed my signature in the presence of two witnesses.

JASPER N. HIERONYMUS.

Witnesses:
 NEWTON ELSON FULTON,
 GEORGE ALBERT SUTTON.